(12) United States Patent
D'Souza et al.

(10) Patent No.: US 6,625,649 B1
(45) Date of Patent: Sep. 23, 2003

(54) RAPID NETWORK ACCESS COMPUTER SYSTEM

(75) Inventors: Henry D'Souza, Cypress, TX (US); Gokalp Bayramoglu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/093,246

(22) Filed: Jun. 8, 1998

(51) Int. Cl.[7] .............................................. G06F 15/173
(52) U.S. Cl. ....................................... 709/225; 345/172
(58) Field of Search ........................ 709/225; 345/172, 345/334, 327, 158, 168, 171; 341/20, 21, 22, 23, 35

(56) References Cited

U.S. PATENT DOCUMENTS

| | | | | |
|---|---|---|---|---|
| 4,698,757 A | * | 10/1987 | Dill et al. ..................... | 713/201 |
| 5,214,429 A | * | 5/1993 | Greenberger ................. | 341/22 |
| 5,287,526 A | * | 2/1994 | Wolf et al. ................... | 395/800 |
| 5,381,530 A | | 1/1995 | Thayer et al. ............... | 395/275 |
| 5,410,706 A | | 4/1995 | Farrand et al. .............. | 395/700 |
| 5,440,699 A | | 8/1995 | Farrand et al. .............. | 395/155 |
| 5,600,313 A | * | 2/1997 | Freedman ..................... | 341/22 |
| 5,610,601 A | | 3/1997 | Lahti et al. .................... | 341/22 |
| 5,655,077 A | * | 8/1997 | Jones et al. ................... | 713/201 |
| 5,790,103 A | * | 8/1998 | Willner ........................ | 345/168 |
| 5,809,143 A | * | 9/1998 | Hughes ........................ | 705/77 |
| 5,818,361 A | * | 10/1998 | Acevedo ...................... | 341/23 |
| 5,854,624 A | * | 12/1998 | Grant .......................... | 345/169 |
| 5,867,729 A | * | 2/1999 | Swonk ......................... | 395/828 |

(List continued on next page.)

FOREIGN PATENT DOCUMENTS

NL          C-1 007 961          7/1999

OTHER PUBLICATIONS

Logitech, Surfman cordless internet controller, advertize page, 1996, 1 page.*
Ed Van Balen, "Programmable Keyboard and Internet News", Newsgroup: microsoft.public.internet.news, 1997, 3 pages.*
Sven Guckes, "The internet Keyboard", Newsgroup: comp.sys.mac.apps, 1993, 5 pages.*
The Hellenic Discussion List, "Internet—Keyboard—MAC", Newsgroups: bit.listserv.hellas, 1994, 3 pages.*
Procomm plus user manual, copyright 1990, pages cover 16, 17, 126.*
Procomm plus Aspect Script Language Reference Manual, copyright 1990, pages cover, copyright page, 195–208.*
Caton et al., "Darwin keyboard/software puts Web at users' fingertips",12/96,, PCweek 2 pages.*
"Darwin keyboards introduces the launchboard", 11/96, darwinkeyboards.com, 3 pages.*
Darwin Keyboards Ltd., "Darwin keyboards introduces LaunchBoard software 2.0", PR Netwire, Jun. 11, 1997, 7 pages.*

(List continued on next page.)

Primary Examiner—Bunjob Jaroenchonwanit

(57) ABSTRACT

A computer system is disclosed for providing rapid access to preconfigured Internet sites. The system includes a keyboard or similar input device having switches which are closed to produce unique Internet access signals. A signal processing circuit places the computer system in communication with corresponding unique Internet sites in response to the Internet access signals. Application software is also launched as required by the particular access switch, such as for electronic commerce or electronic messaging. If the system is not yet logged onto the network, a log-on routine is executed in response to the access signals. A user may actuate the switches to rapidly access desired Internet sites and to perform operations at the sites without the need to navigate through a series of on-screen windows or menus.

12 Claims, 4 Drawing Sheets

U.S. PATENT DOCUMENTS

| | | | | |
|---|---|---|---|---|
| 5,895,462 A | * | 4/1999 | Toki | 707/3 |
| 5,900,867 A | * | 5/1999 | Schindler et al. | 345/327 |
| 5,905,493 A | * | 5/1999 | Belzer et al. | 345/334 |
| 5,926,170 A | * | 7/1999 | Oba | 345/168 |
| 5,949,643 A | * | 9/1999 | Batio | 361/681 |
| 5,986,586 A | * | 11/1999 | Tsai | 341/22 |
| 5,999,950 A | * | 12/1999 | Krueger et al. | 715/535 |
| 6,011,495 A | * | 1/2000 | Chen | 341/22 |
| 6,014,131 A | * | 1/2000 | Barry et al. | 345/172 |
| 6,018,335 A | * | 1/2000 | Onley et al. | 345/172 |
| 6,047,196 A | * | 4/2000 | Makela et al. | 455/556 |
| 6,243,035 B1 | * | 6/2001 | Walter et al. | 341/176 |
| 6,275,944 B1 | * | 8/2001 | Kao et al. | 713/202 |
| 2001/0005199 A1 | * | 6/2001 | Anderson | 345/168 |

OTHER PUBLICATIONS

Nokia Corporation., "Nokia 9000 Communicator User manual", Nokia Coprporation, 1995, 13 pages.*

Newbytes, Logitech Intros New Keyboards with special Web keys, Dialog File 275, 1 page, May 1999.*

Vonder Haar, Steven, "Compaq Holds The Key To Web Navigation Hubs", *Inter@Active*, 'Online' Mar. 16, 1998, 2 pages.

"PC–Bedienung in Variationen", Chip Zeitschrift Fuer Mikrocomputer–Technik, DE, Vogel Verlag, Wurzburg, No. 4, Apr. 1, 1997, pp. 409–411. (No translation.).

Flohr, M, "Tastaturen als Surfbretter", Chip Zeitschrift Fuer Mikrocomputer–Technik, DE, Vogel Verlag, Wurzburg, No. 11, Nov. 1998, p. 258 (No translation.).

Europeon Search Report, Nov. 10, 2000 (3 pages).

Hewlett–Packard Website "HP Pavilion PCS Models 8140 and 8160–Reconfiguring Keyboard Buttons" pp. 1–2; Copyright 1997.

Hewlett–Packard Website "HP Pavilion PC Models 8140 and 8160–Using the One–Touch Multimedia Keyboard" pp. 1–3; Copyright 1997.

* cited by examiner

RAPID NETWORK ACCESS COMPUTER SYSTEM

BACKGROUND OF THE INVENTION

1. Field of the Invention

The present invention relates generally to the field of computer systems for launching user applications and accessing networks, such as the Internet. More particularly, the invention relates to a system including a keyboard or similar input device providing dedicated keys or sensors for launching specific software applications and logging onto specific sites in a network, thereby facilitating electronic commerce, network searching, electronic messaging, and so on.

2. Description of the Related Art

A wide range of uses exist, and a vast array of new uses are being proposed, for open computer networks, such as the Internet. Among these uses are both professional and business applications, such as electronic commerce, communications and document exchange, as well as a range of applications for personal improvement, amusement and research.

In current computer systems, a user may access the network in a variety of manners depending upon the computer configuration. For example, commercially available personal and business computers are typically configured to launch a network access application software program upon a user selecting an icon from an on-screen display. The icon is selected by depressing an enter key on a traditional keyboard, a button on an input device such as a mouse, or by touching the surface of a sensing pad. The application software then generates a series of screens or windows, each of which requires specific selections by the user, requiring additional keystrokes or sensor contacts. Once the user has navigated through the series of windows and selections, the network software program dials a pre-configured phone number and logs the user onto the network, such as via a modem. In certain applications, even these steps require additional keystrokes by the user. Moreover, once the network has been accessed, launching specific application programs or navigating to desired network sites also typically requires similar input processes involving selection of a series of on-screen windows or options, involving a number of keystrokes and movements.

This approach to launching software applications and accessing Internet sites, based upon an on-screen interface and general purpose keyboard or mouse, provides a versatile system accommodating arange of software applications. However, it is not without drawbacks. For example, many users find that of the great number of network sitesand software applications available, a very limited number of these are actually accessed or used on a daily or routine basis. However, each time the site is accessed or the application launched, the same series of keystrokes must be entered. Similarly, many users find that the number and sequence of keystrokes required to navigate to a network log-on page, or to access a desired website tends to be quite repetitive and time-consuming. This is particularly true in view of the fact that users may tend to log directly into or commonly access only a few specific sites. Moreover, as the available content at specific websites improves, users may further limit or focus their access to a few key sites at which they may perform electronic commerce, communications, network searches, and so forth.

In addition to launching application software, logging onto a network and contacting a specific server site, many computer users repeatedly execute a fixed series of commands once at a desired site. For example, one or more of various types of electronic messaging software is typically installed on each user's computer, permitting the user to send and receive electronic messages, files, hyperlinks, and so forth. While certain software packages may be configured by the user to periodically check for incoming messages and download the messages from a server, the user nevertheless typically logs onto a network by navigating through a series of screen-based selections during each work session. Similarly, upon accessing an electronic commerce site, a user may be called on to input identification or other information which is repeated each time the site is accessed.

There is a need, therefore, for an improved technique for launching applications in a computer system, particularly applications related to launching, logging on, and navigating through computer networks. There is a particular need for a simple and straightforward, user-friendly system for rapidly accessing such applications, without the need to navigate through a series of menus or selection screens. Moreover, there is a need for a rapid network access system which can execute desired functions once a network site has been contacted, such as checking for and downloading messages from a server.

SUMMARY OF THE INVENTION

The invention provides a rapid application and network access system designed to respond to these needs. The technique employed may be adapted to various computer platforms, and is particularly well suited to desktop and laptop computers, as well as to work stations and the like. The technique allows a user to launch specific software applications by simply depressing keys on a keyboard or similar input device, or by touching or depressing a similar sensor on the input device. The keys associated with the applications may be dedicated keys on a conventional keyboard. By depressing the dedicated key, the user may not only launch a software application, but may log onto a network, such as the worldwide web or the Internet, and may directly access a desired website. The software application, log-on sequence, and website may be pre-configured in the computer system, or may be user configurable through a set up or reconfiguration program. Moreover, several keys may be provided for accessing different applications, such as logging onto a network default site, navigating to specific websites such as for electronic commerce, checking for and downloading electronic messages, and so forth. Where desired, specific combinations of keystrokes may be provided for launching the applications, logging onto a network, accessing specific sites, and so forth.

In accordance with one aspect of the invention, a computer system includes a keyboard coupled to a signal processing circuit. The keyboard includes a plurality of keys for accessing specific Internet or network sites. Unique signals are generated upon actuation of switches associated with each key. The signals are processed and transmitted to the signal processing circuit. The signal processing circuit places the computer system in communication with unique network sites corresponding to the switch actuated on the keyboard. When application software for accessing the selected site is not already launched, the signal processing circuit launches the application. Similarly, if the system is not already logged onto the network, a routine to accomplish this is executed in response to the signal. Upon accessing specific sites, the system may transmit user-specific identification or other data, and download user-specific data, such as commerce data or electronic messages. The user may thus rapidly access a plurality of sites and carry out Internet operations without the need to navigate through a series of screen-based menus or windows.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
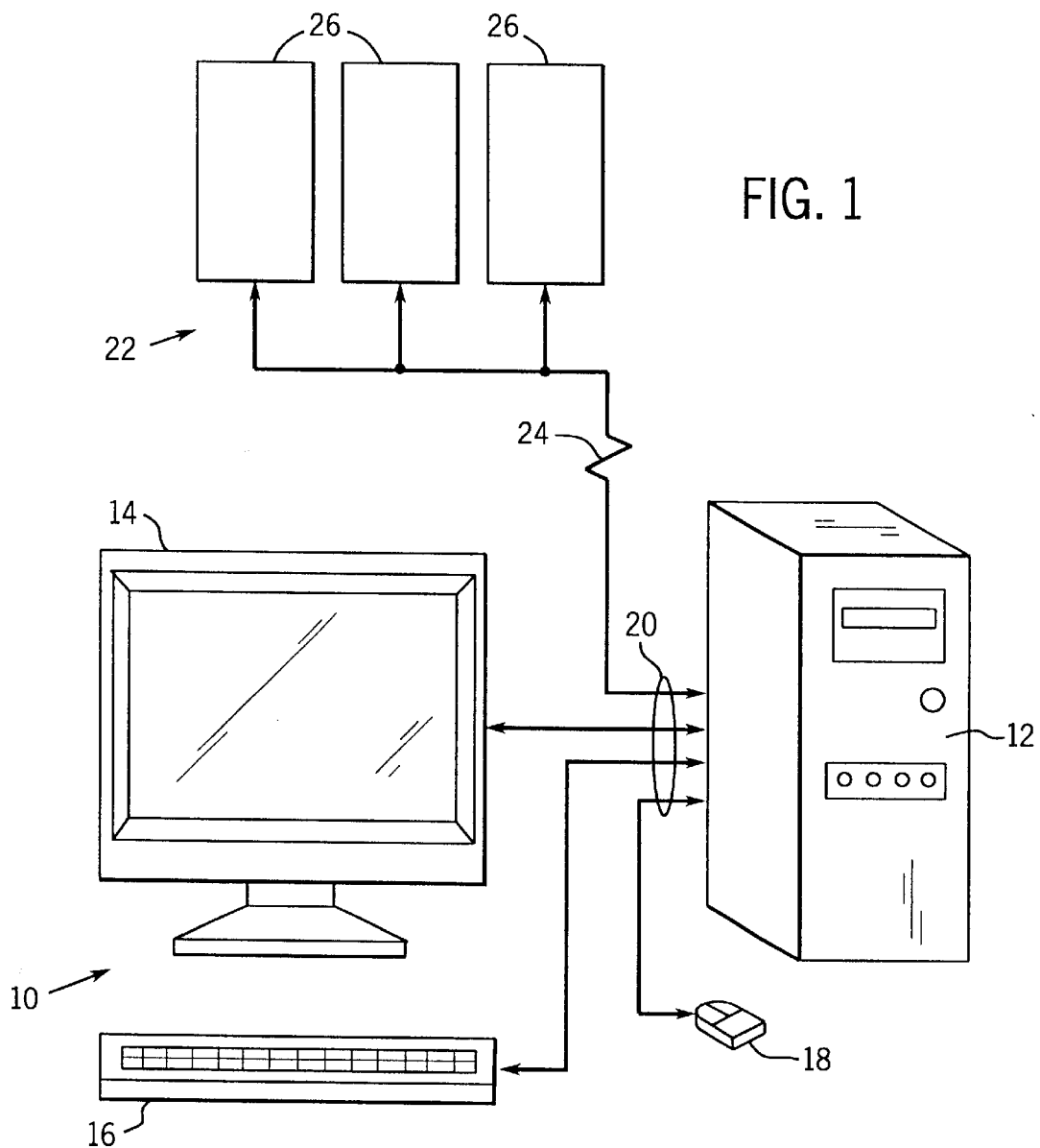
FIG. 1 is a diagrammatical representation of a computer system for communicating with a remote network.

Turning now to the drawings, and referring first to FIG. 1, a computer system 10 is illustrated in the form of a personal computer or workstation. Computer system 10 includes a console 12 housing signal processing, memory, communications, interface, and other circuitry as described more fully below. Console 12 is coupled to a monitor 14 for displaying graphical information to a user of the system. A keyboard 16 is also coupled to console 12 for inputting data and for selecting desired functions, including rapid access to a network. Additional input devices, such as a mouse 18 are coupled to console 12, providing additional input capabilities. The components of computer system 10 are interconnected by data cables 20, which may be standard serial or parallel data transmission assemblies. Alternatively, one or more of the components of computer system 10 may be configured to transmit and receive data by means of infrared transceivers or various alternative data transmission techniques.

Computer system 10 is adapted for connection to a remote network, such as the Internet, designated generally by reference number 22. In particular, console 12 is coupled to a remote communications line 24, such as a conventional telephone cable. Upon execution of network access routines as described below, computer system 10 is placed in communication with remote computer terminals or servers 26 comprising network 22. While reference is made in the present description to communication with a network, particularly with the Internet, via conventional telephone cables, it should be noted that various alternative configurations may be envisaged for exchanging data between computer system 10 and network 22. Such alternative configurations may include digital subscriber lines, wireless communication media, and so forth.

Figure 2:
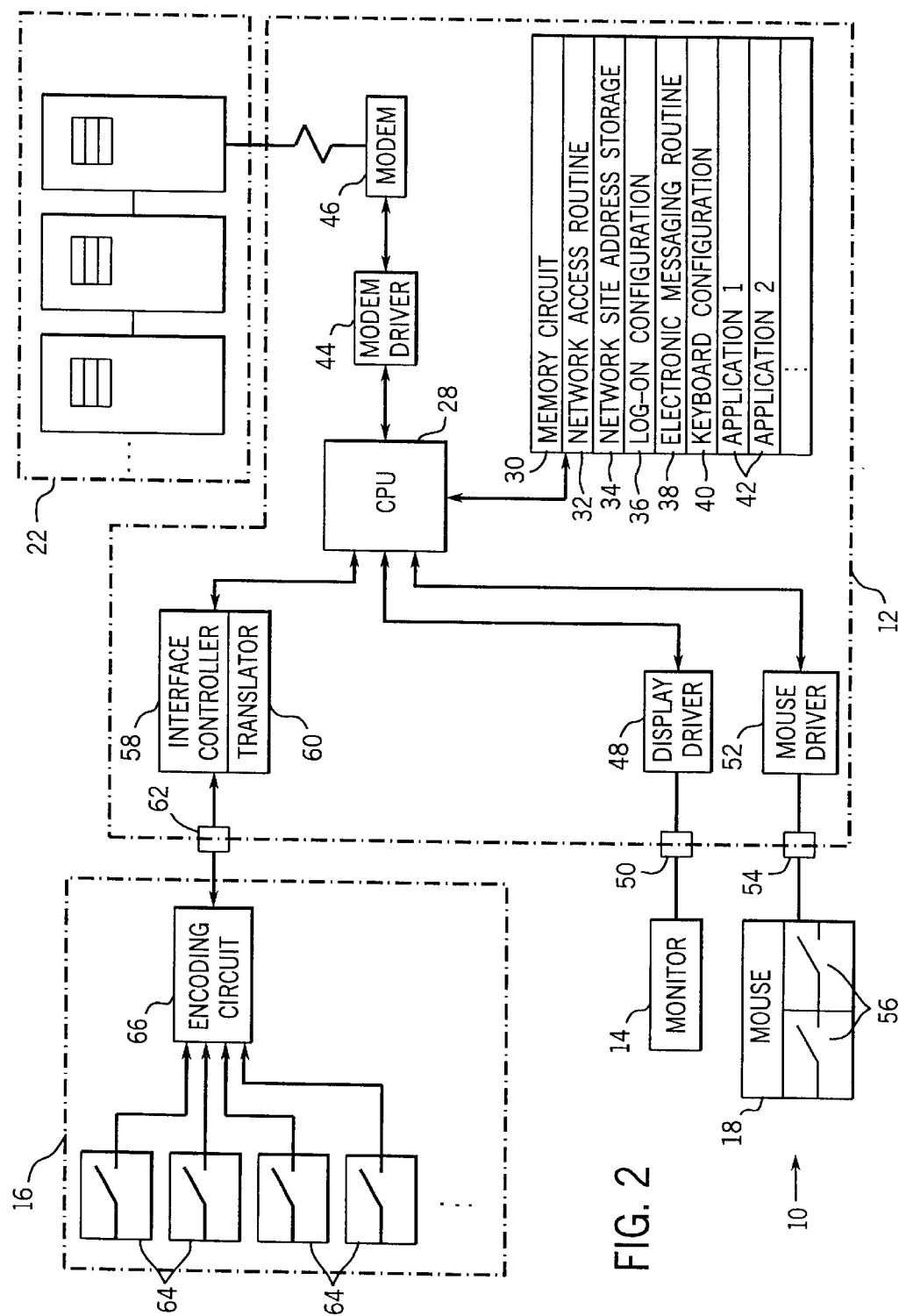
FIG. 2 is a block diagram of the primary functional components of the system of FIG. 1, including an input device in the form of a keyboard having dedicated keys for launching specific software applications and accessing certain network sites.

Functional circuitry components comprising computer system 10 are illustrated in greater detail in FIG. 2. As shown in FIG. 2, console 12 of the computer system includes a CPU 28 configured to execute pre-established software routines stored in a memory circuit 30. CPU 28 may be based on any suitable commercially available platform, such as the Pentium II processor available from Intel. Similarly, memory circuit 30 may include various types and configurations of memory devices, such as random access memory, read only memory, dynamic random access memory, and disk storage, including a resident and removable disk drives. As represented diagramatically in FIG. 2, memory circuit 30 includes a plurality of storage locations containing code for executing specific tasks. In particular, memory circuit 30 preferably stores a network or Internet access routine as represented at 32, a network site address configuration 34, a log-on configuration 36, and electronic messaging routine and configuration 38, a keyboard configuration or map 40, and other application software routines, as represented generally at reference number 42. All of the routines stored in memory circuit 30 are accessible by CPU 28, and certain of these may include executable code for launching the application software.

CPU 28 is also coupled to a series of driver and interface circuits for exchanging data with the peripheral devices included in computer system 10. Specifically, in the illustrated embodiment, CPU 28 is coupled to a modem driver 44 which commands operation of a modem 46. Modem 46 permits CPU 28 to be coupled to network 22 as described below. CPU 28 is also coupled to a display driver 48 which transmits data to be displayed on monitor 14 via a conventional communications port 50. A mouse driver 52 is coupled to CPU 28 and permits input signals to be transmitted to CPU 28 from mouse 18 via a serial port 54. Such input signals originate in switches or sensors 56 provided in mouse 18. While inputs from such switches may be processed in a conventional manner by CPU 28, it should be noted that as described below, mouse 18 may be configured to produce input signals for commanding CPU 28 to execute specific software application code, including for placing computer system 10 in communication with network 22.

CPU 28 is further coupled to a keyboard interface controller 58. Controller 58 commands operations of keyboard 16, and coordinates communication of input signals from keyboard 16 to CPU 28 as described below. A translator 60 is provided for translating input signals in the form of scan code received from keyboard 16, and for generating software interrupts as required by the scan code. Keyboard interface controller 58 and translator 60 are coupled to keyboard 16 through a serial port 62. Keyboard 16 includes an array of keys, as shown generally at reference numeral 64, for producing the input signals processed by keyboard interface controller 58 and translator 60. Upon actuation of keys 64, unique scan code signals corresponding to the respective keys are produced by an encoding circuit 66. This scan code is then transmitted to controller 58 and translator 60 for processing prior to further transmission to CPU 28.

In the embodiment illustrated in FIG. 2, certain of the functional circuitry may be defined by hardware, firmware, or software. For example, drivers 44, 48, and 52 may be defined by appropriate code stored in memory circuit 30. Similarly, translator 60 may be defined by software code stored in a memory circuit. Encoding circuit 66 is preferably defined by firmware provided within keyboard 16. As will be appreciated by those skilled in the art, however, the particular configuration and types of circuits performing the fuinctions for placing the computer system in communication within a remote network, such as the Internet, may be accomplished in various manners. Accordingly, encoding circuit 66 may be provided in console 12 where desired.

Similarly, switches or keys 64 may be incorporated within console 12. Also, the functions described below carried out in response to actuation of the keyboard switches may be provided in response to actuation of general purpose or dedicated switches within the keyboard or within another input device, such as mouse 18.

Figure 3:
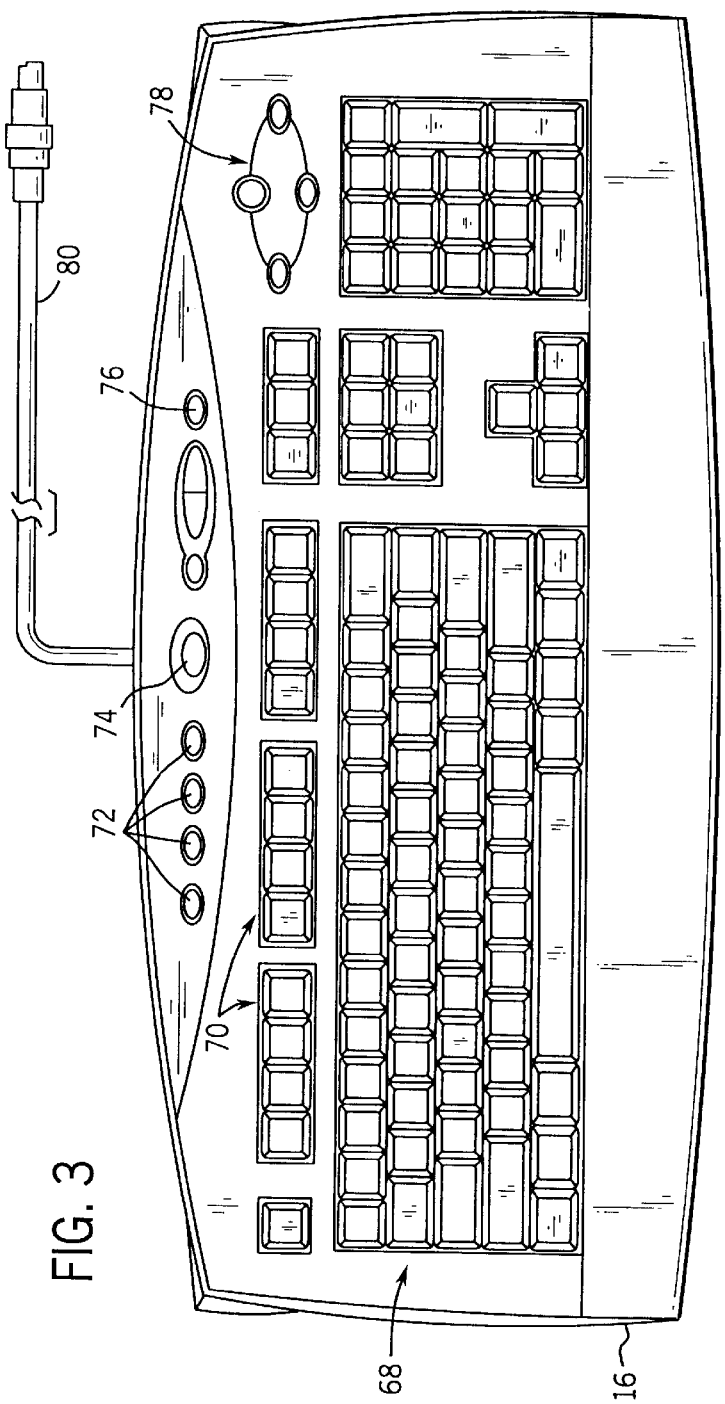
FIG. 3 is a top plan view of a keyboard as illustrated in FIG. 2 particularly well suited for rapid access to software applications and network finctions.
Figure 5:
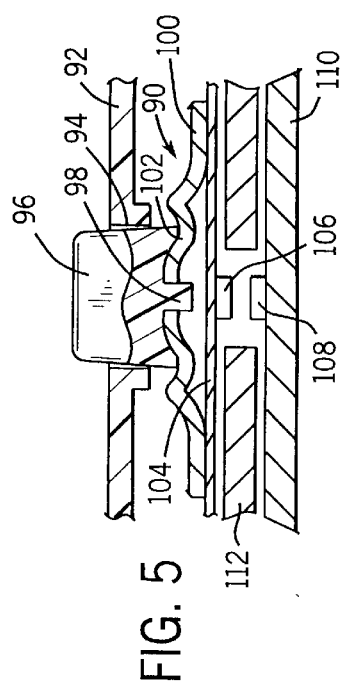
FIG. 5 is a sectional view through an exemplary key and switch arrangement for initiating signals for accessing the Internet in the keyboard of FIG. 3.
Figure 4:
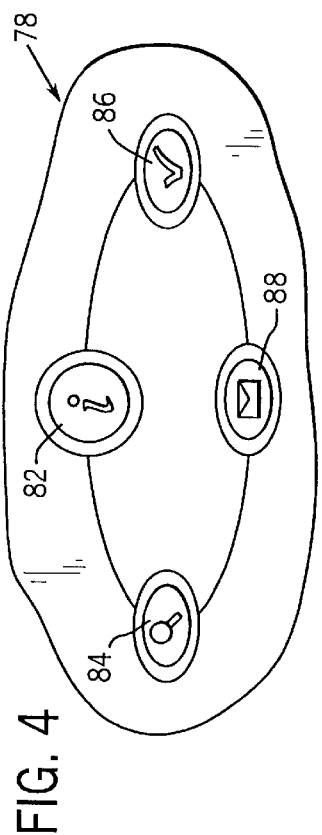
FIG. 4 is a detail view of a keys in a rapid Internet access array of the keyboard of FIG. 3.

FIGS. 3, 4, and 5 illustrate an exemplary keyboard 16, and features of the keyboard for rapidly placing the computer system in communication with specific Internet sites and for performing specific finctions at the sites. As shown in FIG. 3, keyboard 16 is configured as a specially adapted, general purpose keyboard including a standard key array 68 for performing text editing functions and inputting data in a conventional manner. Function keys 70 are provided for executing predetermined functions based upon a particular software applications being run on the computer system.

In addition to standard keys, keyboard 16 includes a series of specialized keys for performing application launch and communication functions. Specifically, in the illustrated embodiment a series of disk drive control keys 72 are provided. These keys preferably permit the user to command operations of a CD drive, such as for fast forwarding, reversing, searching, and so forth. Additional keys may be provided for supplementary finctions, such as for adjusting the volume of speakers included in the computer system. A sleep mode key 74 is provided for placing the computer system in a low power consumption mode. At least one application launch key 76 is also provided. Actuation of this key causes a high-level interrupt for opening or launching a specific user-configurable software application, such as a text editing application. Such keys may also be provided for sending or receiving facsimiles, answering telephone calls, and so forth. An series of dedicated keys are also provided in a designated rapid Internet access array 78. These keys permit the user to launch Internet access application software, log on to the Internet, and to navigate directly to specific Internet sites without the need to navigate through a series of screen-based menus. Finally, keyboard 16 includes a cable assembly 80 for providing data transfer to the computer console.

FIG. 4 illustrates the keys provided in rapid Internet access array 78 in somewhat greater detail. In particular, the array includes dedicated keys for rapidly accessing specific sites on the Internet. In the illustrated embodiment, these include an Internet log-on key 82 for executing a Internet web browser application and accessing a default or home site. A search engine key 84 is provided for placing the computer system in communication with an Internet search engine site. An electronic commerce key 86 is provided in the array for directly accessing an electronic commerce site. Finally, an electronic messaging key 88 is provided for launching an electronic messaging application and for contacting a desired electronic messaging server.

As shown in FIG. 4, each of the dedicated keys carries indicia in the form of a molded or printed icon, indicating the function of each key. As summarized in greater detail below, the keys in the rapid Internet access array may be preset to default sites upon initial configuration of the computer system. However, one or more of the keys may also be user configurable to allow a user to program desired site addresses by storing code representative of a corresponding universal resource locator (URL) in the memory circuitry of the computer system. Similarly, although in the illustrated embodiment keys 82, 84, 86, and 88 are provided for specific types of Internet sites and applications, where desired these keys may be reconfigurable to access sites of other types of interest to the user. Also as summarized below, it should be noted that not only do the keys provide rapid access functions, but may execute software applications for identifying the user by transmission of user-specific data, such as a user password, credit card number, and so forth. Similarly, actuation of one or more of the keys may result in receipt or downloading of general or user-specific data, such as electronic messages, order confirmations, and so forth.

As illustrated in FIG. 5, in the present embodiment rapid Internet access keys 82, 84, 86, and 88 are depressed by the user to force contact of a membrane switch. The primary components of such a switch are illustrated in FIG. 5. Accordingly, the membrane switch 90 is formed below an upper panel 92 of the keyboard. An aperture 94 is formed at each location in the keyboard corresponding to the location of the key 96. Along a lower region, each key includes a protrusion 98 which extends through a resilient panel 100. Panel 100 forms a biasing region 102 below each key 96 to bias the key into an upward position. A membrane. 104 is positioned below resilient panel 100, and carries a plurality of contacts 106. Each contact 106 is coupled to a conductor in a conductor grid for transmitting signals to an encoding circuit (see FIG. 2). A lower contact 108 is positioned in mutually facing relation to contact 106. Contact 108 may rest on a base plate 110. Like contact 106, contact 108 is coupled to a conductor (not shown) in a grid for transmitting signals to an encoding circuit upon closure of the switch. An insulated separator 112 is positioned between membrane 104 and plate 110. Upon depression of key 96, protrusion 98 forces contact 106 downwardly toward contact 108, thereby completing a conductive path through switch.

Alternative switches may be foreseen in the keyboard for executing the rapid Internet access finctions described below. Such switches may include, for example, capacitive switches. Moreover, it should be noted that the rapid Internet access functions executed in response to actuation or closure of switches 82, 84, 86, and 88 may be accomplished through actuation of a combination of switches on the keyboard. For example, one or more function keys 70 may be designated to execute Internet access in combination with other keys, such as keys, comprising array 68. Alternatively, a rapid Internet access key may be provided as a special function key, and configured to operate in conjunction with secondary keys on the keyboard, such as keys of array 68. A user may then accomplish a similar function, such as navigating directly to Internet sites, performing electronic commerce, accessing electronic messages, and so forth upon depression of the specialized function key and one or more additional keys.

Figure 6:
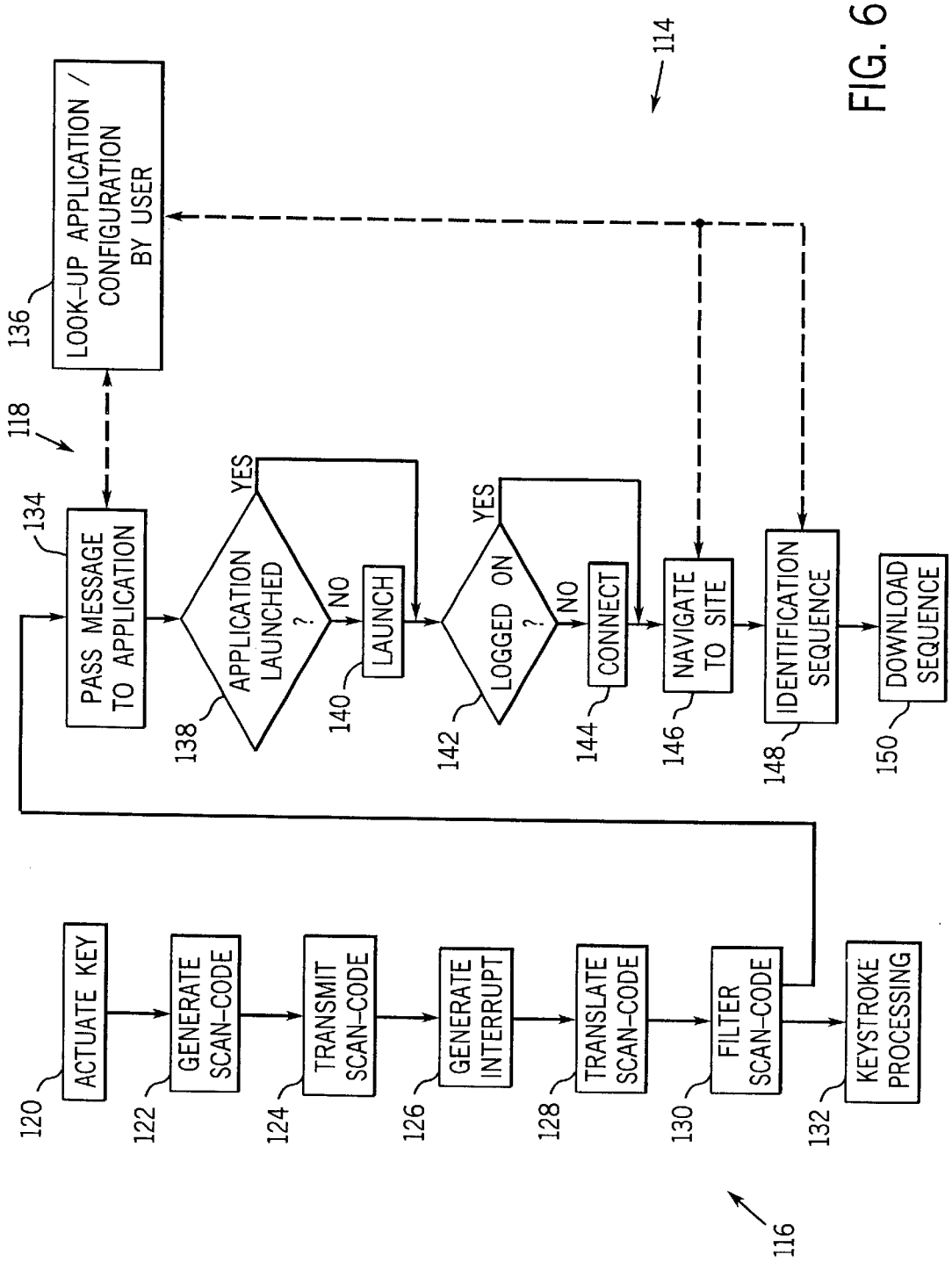
FIG. 6 is a flow chart illustrating exemplary control logic for carrying out the launch and navigation functions of the circuitry illustrated in FIG. 2.

FIG. 6 illustrates steps in exemplary control logic for carrying out rapid Internet access upon actuation of one of the specialized keys in keyboard 16. The control logic, designated generally by reference number 114, may be divided into a sequence of steps 116 for generating and analyzing signals in the form of scan code in response to closure of a switch in keyboard 16. A following sequence of control steps 118 includes processing of the scan code signals followed by execution of application software commands and navigation to specific Internet sites.

The control logic begins at step 120 where a key is actuated by the user. As described above, the key may be one of several dedicated rapid Internet access keys, or may be a combination of keystrokes assigned to Internet access fumctions. In response to closure of the switch associated with the key, the scan code is generated at step 122. The scan code may be generated in the conventional manner, such as via a firmware encoding circuit 66 (see FIG. 2). At step 124, the scan code is transmitted to a keyboard interface controller 54

(see FIG. 2). At step 126, a high level interrupt is generated. This interrupt will be transmitted to CPU 28 to execute control steps 118 independent of any separate application software which may be currently processed by the CPU. At step 128, the scan code is translated by translator 60, and at step 130 the scan code is filtered. Steps 128 and 130 preferably identify the scan code generated in response to actuation of one of the rapid Internet access keys 82, 84, 86, or 88. Where, following step 130, the scan code is found to correspond to a source address of one of the Internet rapid access keys, steps 118 are initiated. However, where following step 130 the scan code is found to correspond to another of the keys or combination of keys of the keyboard 16, normal keystroke processing is performed as indicated generally at step 132.

Once scan code from the keyboard has been identified as corresponding to actuation of one of the rapid Internet access keys, the message is passed to CPU 28 for execution of application software code as indicated at step 134. As indicated above, the specific configurations corresponding to the individual keys may be provided during the initial programming of the computer system. Accordingly, from step 134 CPU 28 accesses specific applications, such as applications 42 illustrated in FIG. 2 in accordance with a look-up configuration table as indicated at step 136. Once this configuration has been identified, CPU 28 then determines whether the corresponding application required for execution of the keystroke command has been launched as shown at step 138. For example, log-on and default key 82 will generally call for launch of an Internet browser and log-on application routine. If at step 138 CPU 28 determines that the application has not been launched, control proceeds to step 140 wherein executable commands stored in memory circuit 30 are processed to load application configuration and launch the program. If the application has been launched at step 138, control advances directly to step 142.

In the illustrated embodiment, all of rapid Internet access keys 82, 84, 86, and 88 call for the computer system to be logged onto (i.e., placed in communication with) a remote network. Accordingly, at step 142 CPU 28 determines whether the computer system is currently logged on to the network. If it is found at step 142 that this is not the case, a connection routine is executed at step 144. As will be appreciated by those skilled in the art, this connection routine includes commands for modem driver 44 and for modem 46 which dial a preconfigured access number for an Internet service provider. The routine also includes steps for transmitting and receiving a sequence of handshake signals, a preconfigured password, and other identification data. In the present embodiment, the user stores such identification data in a log-on configuration (as indicated as reference numeral 36 in FIG. 2) of the memory in the computer system. If at step 142, CPU 28 determines that the computer system is currently logged onto the network, control advances directly to step 146.

As noted above, the sequence of control steps 118 provides for navigation directly to several Internet sites or network servers. URL addresses for these sites are preferably stored in the memory circuitry of the computer system and are accessed at step 146 during navigation to the site. At step 146, CPU 28 reads code stored in the memory circuit by reference to a look-up table as indicated at step 136. The address is transmitted from the computer system to access the corresponding site. The site accessed at step 146 will correspond to the scan code generated by actuation of one of the rapid Internet access keys 82, 84, 86, or 88. For example, upon actuation of key 82, CPU 28 reads a stored address for a default site from the memory circuit and accesses the site. When the user is already operating in a browser, and logged onto the network, actuation of a different key results in navigation to the corresponding other Internet site at step 146. Thus, the user may easily and rapidly access different Internet sites without the need to navigate through a series of screen-based menus, bookmarks, site listings, and so forth.

Where the particular software application or Internet site calls for identification or log-on information from the user, CPU 28 is configured to transmit such data in an identification sequence 148. For example, when electronic commerce key 86 is actuated, and scan code corresponding thereto is generated, the corresponding electronic commerce site is accessed. As noted above, if the corresponding software application is not yet launched, this is performed, and if the computer system is not yet logged onto the Internet, this also is performed prior to exchange of the identification data. The identification data is then exchanged with the site through the identification sequence, removing the need to input user-specific identification data or to navigate through a series,of menus. Such identification data is preferably stored in memory circuitry within the computer system and may be configured by the user in an initial site access, or reconfigured subsequent thereto.

In addition to exchanging user-specific identification data, CPU 28 may execute data transmission or download sequences as indicated at step 150 in FIG. 6. For example, when electronic messaging key 88 is actuated, a preconfigured messaging server is accessed at step 146, and user-specific identification data is exchanged at step 148. Following this data exchange, and preferably with no further input from the user, CPU 28 may download any stored messages from the server.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, while in the foregoing description reference has been made to a general purpose keyboard having dedicated keys for rapid access to the Internet sites configured in the computer system, various alternative forms of input devices may be envisaged. Such keys may be provided in a mouse or similar peripheral input device. Similarly, keys for performing these fumctions may be provided in a remote input device, such as a hand-held radio frequency or infrared controller. Also, where desired, sensitive regions may be provided in a terminal screen for permitting a user to generate Internet access signals for addressing specific Internet sites upon touching pre-established locations on the screen.

What is claimed is:

1. A computer system adapted to access remote computer network sites, including Internet sites, the computer system comprising:

a keyboard having a plurality of operator actuated Internet access keys including a dedicated, preprogrammed browser application key operable to initiate launching of a browser application; said keys also including a plurality of dedicated, preprogrammed keys for accessing, respectively, a predetermined Internet search site, a predetermined electronic commerce site and a predetermined electronic messaging site, said keys further including at least one configurable Internet access key which is user programmable for accessing a user selectable Internet site;

a memory circuit configured to store Internet access application routines; and a signal processing circuit coupled to the keyboard and to the memory circuit, the signal processing circuit receiving Internet access signals corresponding to actuation of a respective Internet access key, executing an application access routine in response thereto, by launching said related application, determining whether or not the computer system is logged on to the Internet, and (a) if so, navigating to the particular Internet site associated with the actuated Internet access key, (b) if not, automatically executing an Internet logon routine and then navigating to said particular Internet site without further operator intervention.

2. The computer system of claim 1, wherein the signal processing circuit is configured to respond to actuation of said Internet access key for accessing a predetermined electronic messaging site and to download incoming messages by executing an electronic messaging access and transfer routine stored in the memory circuit after establishing said communication link with and logging on to the Internet.

3. The computer systemn of claim 1, wherein when the computer system has accessed an Internet site, operation of an Internet access key to access a different Internet site causes the signal processor automatically to navigate directly to said different site without further operator intervention.

4. The computer system of claim 1, wherein the signal processing circuit is also configured automatically to execute commands to identify the computer system and to download data designated for the identified computer system following navigation to an Internet site.

5. The computer system of claim 1, further comprising a memory circuit coupled to the signal processing circuit for storing desired network site addresses, and wherein the signal processing circuit is configured to access remote networked computers corresponding to the network site addresses in response to network access input signals.

6. The computer system of claim 1, wherein the signal processing circuit is configured to transmit user-specific user-identification data stored in said memory circuit, when navigating to the Internet site in response to an Internet access signal.

7. A computer system adapted to access remote Internet sites, the computer system comprising:

a keyboard having a plurality of operator actuated Internet access keys generating Internet access signals in response to actuation, said keys including a dedicated, preprogrammed browser application key for launching a browser application to access a default Internet site; said Internet access keys also including a plurality of dedicated, preprogrammed keys for accessing, respectively, a predetermined Internet search site, a predetermined electronic commerce site and a predetermined electronic messaging site, said keys further including at least one configurable Internet access key which is user programmable for accessing a user selectable Internet site;

a memory circuit configured to store Internet access application routines; and a signal processing circuit coupled to the keyboard and to the memory circuit, the signal processing circuit receiving Internet access signals corresponding to actuation of a respective Internet access key, executing an application access routine in response thereto, launching said related application, and determining whether or not the computer system is logged on to the Internet, and (a) if so, navigating to the particular Internet site associated with said the actuated Internet access key, (b) if not, automatically executing an Internet logon routine and then navigating to said particular Internet site without further operator intervention; and wherein the signal processing circuit is also configured automatically to transmit user-specific user-identification data stored in said memory circuit, when navigating to the Internet site in response to an Internet access signal, and to execute commands to identify the computer system and to download data designated for the identified computer system following navigation to an Internet site.

8. The computer system of claim 7, wherein when the computer system has accessed an Internet site, operation of an Internet access key to access a different Internet site causes the signal processor automatically to navigate directly to said different site without further operator intervention.

9. A computer system adapted to access remote computer network sites, including Internet sites, the computer system comprising:

a memory circuit configured to store Internet access application routines and site address identification;

a keyboard having a plurality of operator actuated keys including a main array of data entry and editing keys and further including Internet access keys generating Internet access signals in response to actuation, said Internet access keys including a dedicated, preprogrammed browser application key for initiating launching of a browser application to access a default Internet site; said Internet access keys also including at least one dedicated key preset on initial configuration of the computer system to initiate access to a predetermined Internet site address stored in said memory circuit, said Internet access keys further including at least one configurable key which is user programmable to store a user selectable address in said memory circuit for accessing an Internet site corresponding to said address; and a signal processing circuit coupled to the keyboard and to the memory circuit, the signal processing circuit receiving Internet access signals corresponding to actuation of a respective Internet access key, executing an application access routine in response thereto, by launching said related application, determining whether or not the computer system is logged on to the Internet, and (a) if so, navigating to the particular Internet site associated with said the actuated Internet access key, (b) if not, automatically executing an Internet logon routine and then navigating to said particular Internet site without further operator intervention.

10. The computer system of claim 9 wherein each key in the group of Internet access keys is shaped distinctively with respect to keys in said main array of keys.

11. The computer system of claim 9, wherein when the computer system has accessed an Internet site, operation of an Internet access key to access a different Internet site causes the signal processor automatically to navigate directly to said different site without further operator intervention.

12. A computer system adapted to access remote computer network sites, including Internet sites, the computer system comprising:

a memory circuit configured to store Internet access application routines and Internet access addresses;

a keyboard having a plurality of operator actuated keys including a main array of data entry and editing keys and further including Internet access keys generating Internet access signals in response to actuation, said Internet access keys including a dedicated, preprogrammed browser application key for initiating launching of a browser application for accessing a default Internet site; said Internet access keys also including a plurality of keys dedicated to accessing, respectively, a predetermined Internet search site, a predetermined electronic commerce site and a predetermined electronic messaging site, each of said dedicated internet access keys preset on initial configuration of the computer system to Initiate access to a corresponding Internet site address stored in said memory circuit, said keys further including at least one configurable Internet access key which is user programmable for accessing a user selectable Internet site, said Internet access keys comprising a group separated from said main array of keys; and a signal processing circuit coupled to the keyboard and to the memory circuit, the signal processing circuit receiving Internet access signals corresponding to actuation of a respective Internet access key, executing an application access routine in response thereto, by launching said related application, determining whether or not the computer system is logged on to the Internet, and (a) if so, navigating to the particular Internet site associated with said the actuated Internet access key, (b) if not, automatically executing an Internet logon routine and then navigating to said particular Internet site without further operator intervention.

* * * * *